(12) United States Patent
Ishida et al.

(10) Patent No.: US 9,802,667 B2
(45) Date of Patent: Oct. 31, 2017

(54) VEHICLE BODY FRAME STRUCTURE FOR SADDLE-TYPE VEHICLE

(71) Applicant: HONDA MOTOR CO., LTD., Tokyo (JP)

(72) Inventors: Shinichiro Ishida, Wako (JP); Masao Akieda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 20 days.

(21) Appl. No.: 14/883,093

(22) Filed: Oct. 14, 2015

(65) Prior Publication Data
US 2016/0107715 A1    Apr. 21, 2016

(30) Foreign Application Priority Data

Oct. 16, 2014  (JP) ................................. 2014-212027

(51) Int. Cl.
| B62K 11/02 | (2006.01) |
| B62K 11/04 | (2006.01) |
| B62K 19/20 | (2006.01) |
| B62K 11/12 | (2006.01) |
| B62K 11/14 | (2006.01) |
| B62K 19/32 | (2006.01) |

(52) U.S. Cl.
CPC .............. *B62K 11/04* (2013.01); *B62K 11/12* (2013.01); *B62K 11/14* (2013.01); *B62K 19/20* (2013.01); *B62K 19/32* (2013.01)

(58) Field of Classification Search
CPC ......... B62K 11/04; B62K 11/12; B62K 11/14; B62K 19/32; B62K 19/20
See application file for complete search history.

(56) References Cited

U.S. PATENT DOCUMENTS

| 4,660,854 | A  | * | 4/1987  | Suzuki ................... | B62K 11/04 180/219 |
| 5,261,504 | A  | * | 11/1993 | Katsura ................... | B62K 11/04 180/219 |
| 7,296,814 | B2 | * | 11/2007 | Miyamoto ............. | B62K 19/12 180/219 |
| 2001/0023789 | A1 | * | 9/2001 | Uneta .................... | B62K 11/04 180/218 |
| 2002/0043415 | A1 | * | 4/2002 | Okuma .................. | B62K 11/04 180/225 |
| 2004/0182634 | A1 | * | 9/2004 | Adachi .................. | B62K 11/04 180/312 |
| 2006/0157955 | A1 | * | 7/2006 | Kurokawa ............. | B62K 11/04 280/279 |

(Continued)

FOREIGN PATENT DOCUMENTS

JP     2006-123655 A    5/2006

*Primary Examiner* — Tony Winner
*Assistant Examiner* — Gabriela C Craciun
(74) *Attorney, Agent, or Firm* — Squire Patton Boggs (US) LLP

(57) ABSTRACT

A vehicle includes left and right main frames that may have their front ends connected to a head pipe, and may be disposed such that the distance between the left and right main frames is progressively greater in a rearward direction. The left and right main frames may be connected to each other by an upper plate-like member, and the upper plate-like member may have a front edge spaced rearwardly from the head pipe and have left and right ends welded respectively to the left and right main frames.

12 Claims, 10 Drawing Sheets

(56) References Cited

U.S. PATENT DOCUMENTS

| | | | | |
|---|---|---|---|---|
| 2007/0018420 A1* | 1/2007 | Hoshi | ................... | B62K 19/12 280/274 |
| 2007/0107967 A1* | 5/2007 | Satake | ................... | B62J 17/02 180/218 |
| 2007/0216132 A1* | 9/2007 | Ozawa | ..................... | B62J 1/28 280/304.5 |
| 2008/0110688 A1* | 5/2008 | Miyashiro | ............ | B62K 25/283 180/311 |
| 2011/0240392 A1* | 10/2011 | Iwata | ................... | B60K 11/04 180/229 |
| 2012/0161418 A1* | 6/2012 | Kawai | ................... | B62K 19/10 280/281.1 |
| 2012/0187654 A1* | 7/2012 | Kawai | ................. | B60T 8/3685 280/288.4 |
| 2012/0193155 A1* | 8/2012 | Hasegawa | ............. | B62K 11/04 180/65.1 |
| 2012/0247862 A1* | 10/2012 | Nishimura | ............. | B62K 11/04 180/299 |
| 2013/0020781 A1* | 1/2013 | Kishikawa | ............. | B62K 19/20 280/281.1 |
| 2013/0098701 A1* | 4/2013 | Hirano | ................. | B62K 11/04 180/227 |
| 2015/0068830 A1* | 3/2015 | Nakata | .................. | B60K 11/04 180/229 |

* cited by examiner

VEHICLE BODY FRAME STRUCTURE FOR SADDLE-TYPE VEHICLE

BACKGROUND

Field

Embodiments of the present invention relate to a vehicle body frame structure for a saddle-type vehicle which is reinforced in the periphery of a head pipe.

Description of the Related Art

Heretofore, there has been disclosed a vehicle body frame structure in which a pair of left and right main frames extend rearwardly from a head pipe and a plate-like member is welded to and extends across the head pipe and the pair of main frames (see, for example, Japanese Patent Laid-Open No. 2006-123655 (Patent Document 1)).

According to Patent Document 1, since plate-like member is welded to both the head pipe and the left and right main frames, the weld length is increased. In a region where the left and right main frames are close to the head pipe, it is difficult to weld the plate-like member, and it is hard to confirm the welded parts because the distance between the left and right main frames is small. Furthermore, as the plate-like member has a pointed distal end near the head pipe, when a plurality of plate-like members are cut off a stock, a number of pieces that cannot be used are produced from the stock, with the result that the yield of the plate-like member is lowered.

SUMMARY

It is an object of certain embodiments of the present invention to provide a vehicle body frame structure for a saddle-type vehicle which allows working efficiency to be increased by reducing the weld length and avoiding welding operation in small regions, and which increases the yield of upper plate-like members and improves working efficiency for confirming the quality of a weld in a front portion of a vehicle body frame.

In a vehicle body frame structure for a saddle-type vehicle which includes a head pipe, a pair of left and right main frames disposed rearwardly of the head pipe, and a down frame positioned forwardly of an engine that is disposed below the main frames and downwardly of the main frames. The left and right main frames have front ends connected to the head pipe and are disposed such that a distance between the left and right main frames is progressively greater in a rearward direction. The left and right main frames are connected to each other by an upper plate-like member, and the upper plate-like member is spaced rearwardly from the head pipe and has left and right ends welded respectively to the left and right main frames.

In certain embodiments, the upper plate-like member may extend along direction in which the main frames extend, and may be welded to the main frames below vertical center of inner side surfaces of the main frames. An upper patch may be disposed above the upper plate-like member and may be welded to a rear surface of the head pipe and upper surfaces of the left and right main frames, and may have a rear end disposed rearwardly of a front end of the upper plate-like member.

In some embodiments, each of the main frames may include a tubular member. The upper plate-like member may be welded to the main frames in ranges from inner surfaces thereof to lower surfaces thereof, and a side plate-like member may be welded to outer side surfaces of the main frames, the down frame, and a lower extension extending downwardly from the main frames of the upper plate-like member.

In certain embodiments, a stiffener frame in the form of a pipe member may extend forwardly from the left and right main frames and have a front end portion connected to the down frame by the side plate-like member, and a lower end of the upper plate-like member may be welded to the stiffener frame.

In some embodiments, the side plate-like member may be welded to side surfaces of the down frame and disposed so as to cover a front portion of the stiffener frame from one side.

In certain embodiments, the stiffener frame may include, on a front end portion thereof, an extension extending along widthwise directions of the vehicle. The extension may be spaced rearwardly from the down frame, and the lower end of the upper plate-like member may be connected to the extension.

In some embodiments, the upper plate-like member and the side plate-like member may cooperate with at least the down frame in forming a box-shaped structure.

According to certain embodiments of the present invention, the left and right main frames may have their front ends connected to the head pipe, and may be disposed such that the distance between the left and right main frames is progressively greater in a rearward direction. The left and right main frames may be connected to each other by the upper plate-like member, and the upper plate-like member may be spaced rearwardly from the head pipe and may have left and right ends welded respectively to the left and right main frames. Therefore, the left and right main frames may be connected to each other by the upper plate-like member in a region where the distance between the left and right main frames is large. Working efficiency may be increased by reducing the weld length and avoiding welding operation in small regions. The joined rigidity of the main frames and the head pipe can be well-rendered, and the yield of plate-like members may be increased. The welded regions of the front portion of the vehicle body frame can be confirmed for weld quality.

The upper plate-like member may extend along the direction in which the main frames extend, and may be welded to the main frames below the vertical center of the inner side surfaces of the main frames. The upper patch may be disposed above the upper plate-like member and may be welded to the rear surface of the head pipe and the upper surfaces of the left and right main frames, and may have its rear end disposed rearwardly of the front end of the upper plate-like member. Therefore, the upper patch may conceal the front end of the upper plate-like member and the welded regions between the upper plate-like member and the main frames, allowing the vehicle body frame to have a good appearance. Even though the vehicle body frame is of such a structure, the front portion of the vehicle body frame can easily be confirmed for weld quality from between the upper plate-like member and the upper patch.

Each of the main frames may include a tubular member. The upper plate-like member may be welded to the main frames in ranges from the inner surfaces to the lower surfaces, and the side plate-like member may be welded to the outer side surfaces of the main frames, the down frame, and the lower extension of the upper plate-like member extending downwardly from the main frames. Consequently, the head pipe, the main frames, the down frame, the upper plate-like member, and the side plate-like member may jointly define the box-like space behind the head pipe. The frame rigidity in the periphery of the head pipe may be increased to allow the front portion of the vehicle body frame to bear large external forces applied from the front wheel when the vehicle travels on rough terrain.

The stiffener frame in the form of a pipe member may extend forwardly from the left and right main frames and have its front end portion connected to the down frame by the side plate-like member. The lower end of the upper plate-like member may be welded to the stiffener frame. Therefore, the upper plate-like member may be reinforced by the stiffener frame.

The side plate-like member may be welded to the side surfaces of the down frame and disposed so as to cover the front portion of the stiffener frame from one side. Therefore, the box-like space may be increased in size, and the stiffener frame may be well supported while withstanding large external forces from the front wheel.

The stiffener frame may include, on its front end portion, the extension extending along the widthwise directions of the vehicle. The extension may be spaced rearwardly from the down frame, and the lower end of the upper plate-like member may be connected to the extension. Since the stiffener frame is not directly connected to the down frame, the rigidity of the vehicle body frame in the periphery of the head pipe may be prevented from being excessively increased.

Moreover, the upper plate-like member and the side plate-like member cooperate with at least the down frame in providing the box-shaped structure. Consequently, the upper portion of the down frame may be reinforced by the highly rigid box-shaped structure without causing an increase in the weight, and hence the rigidity of the front portion of the vehicle body frame may be increased.

DETAILED DESCRIPTION

Figure 1:
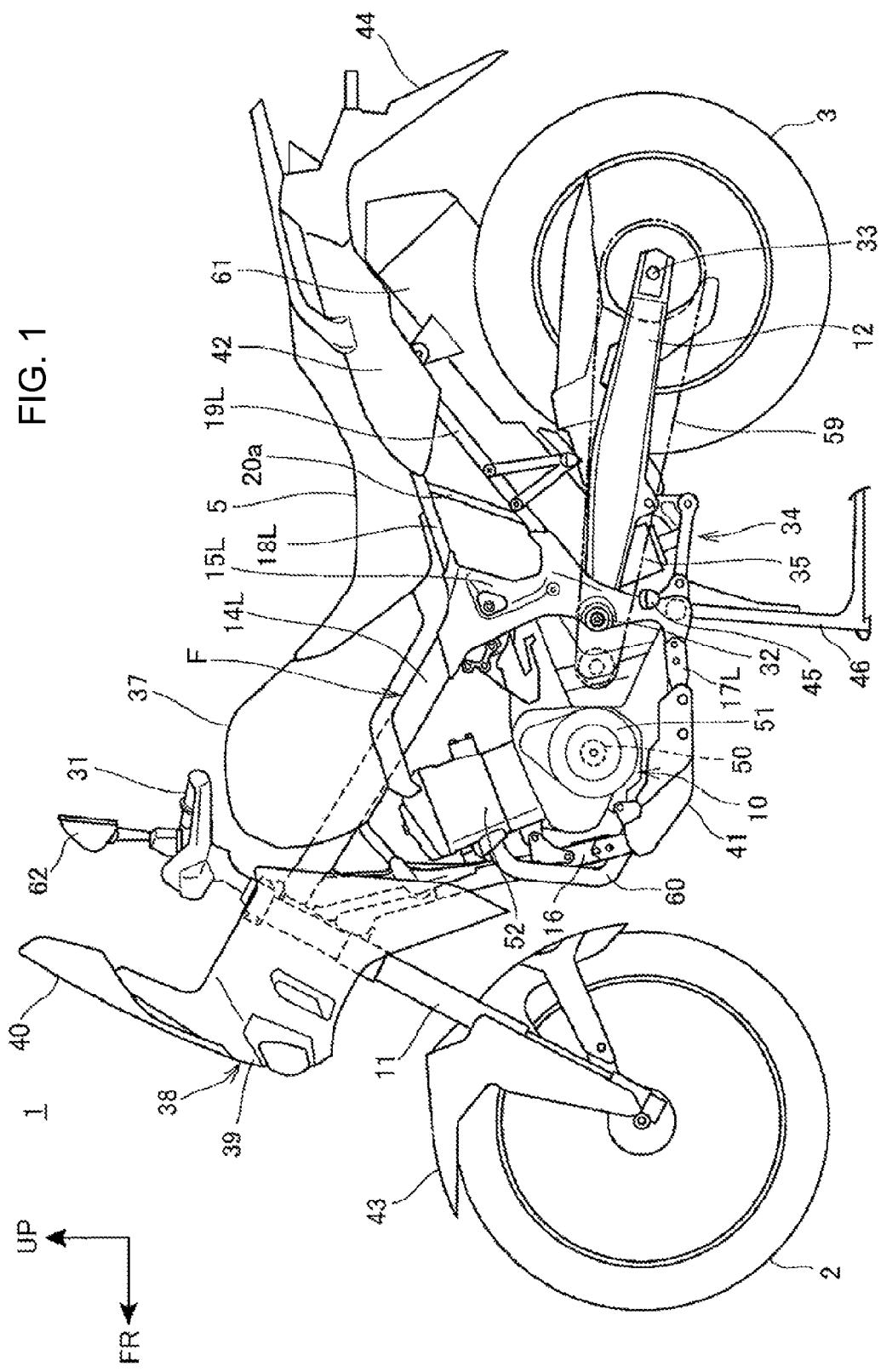
FIG. 1 is a left side elevational view of a motorcycle according to an embodiment of the present invention.

Embodiments of the present invention will be described below with reference to the drawings. In the description, directions such as forward, rearward, leftward, rightward, upward, and downward directions are identical to directions used with respect to a vehicle body unless otherwise specified. In the drawings, the reference characters FR represent the forward direction of the vehicle body, UP represent the upward direction of the vehicle body, and LH represent the leftward direction of the vehicle body.

Figure 2:
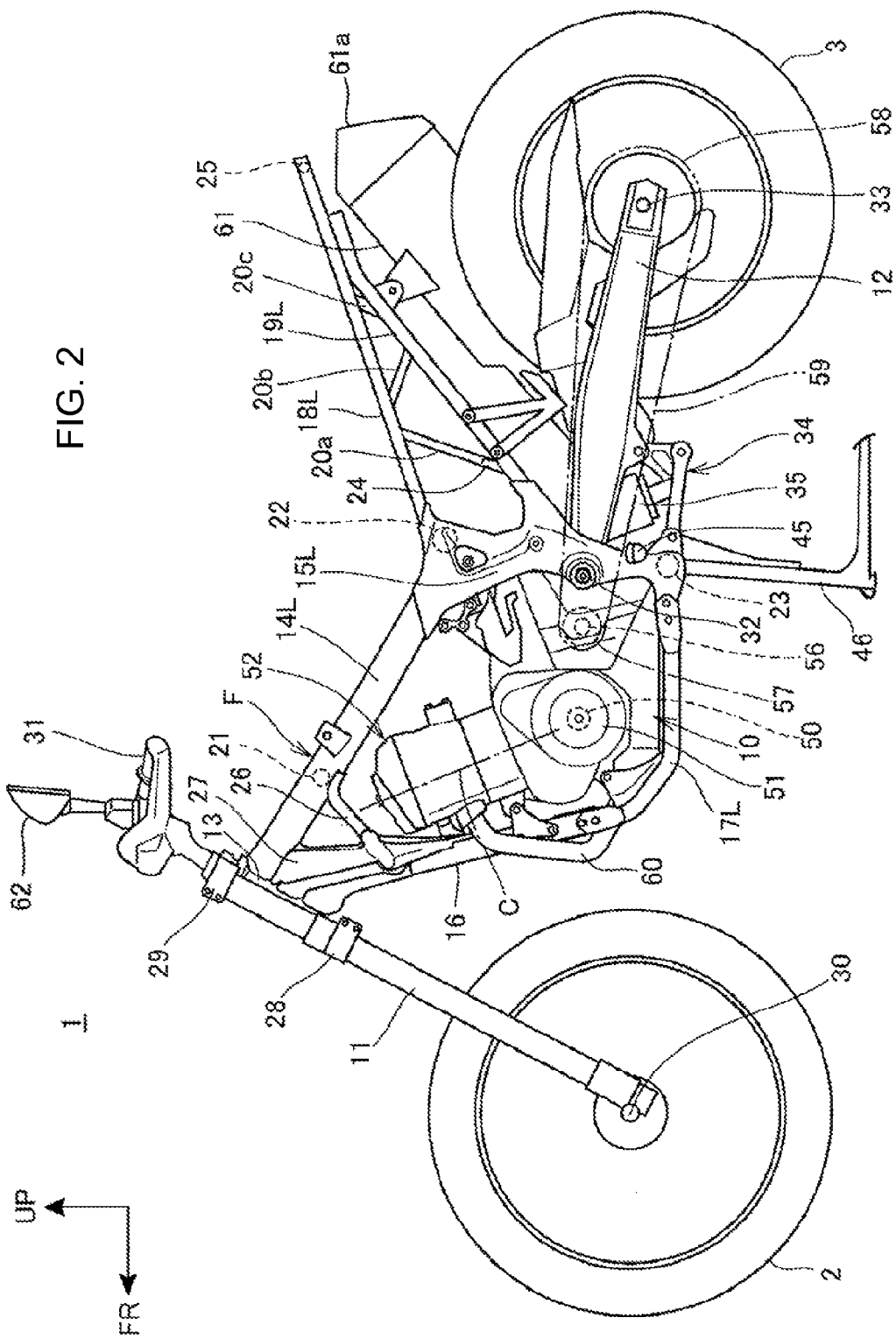
FIG. 2 is a left side elevational view of the motorcycle with a vehicle body cover and accessories being removed.
Figure 3:
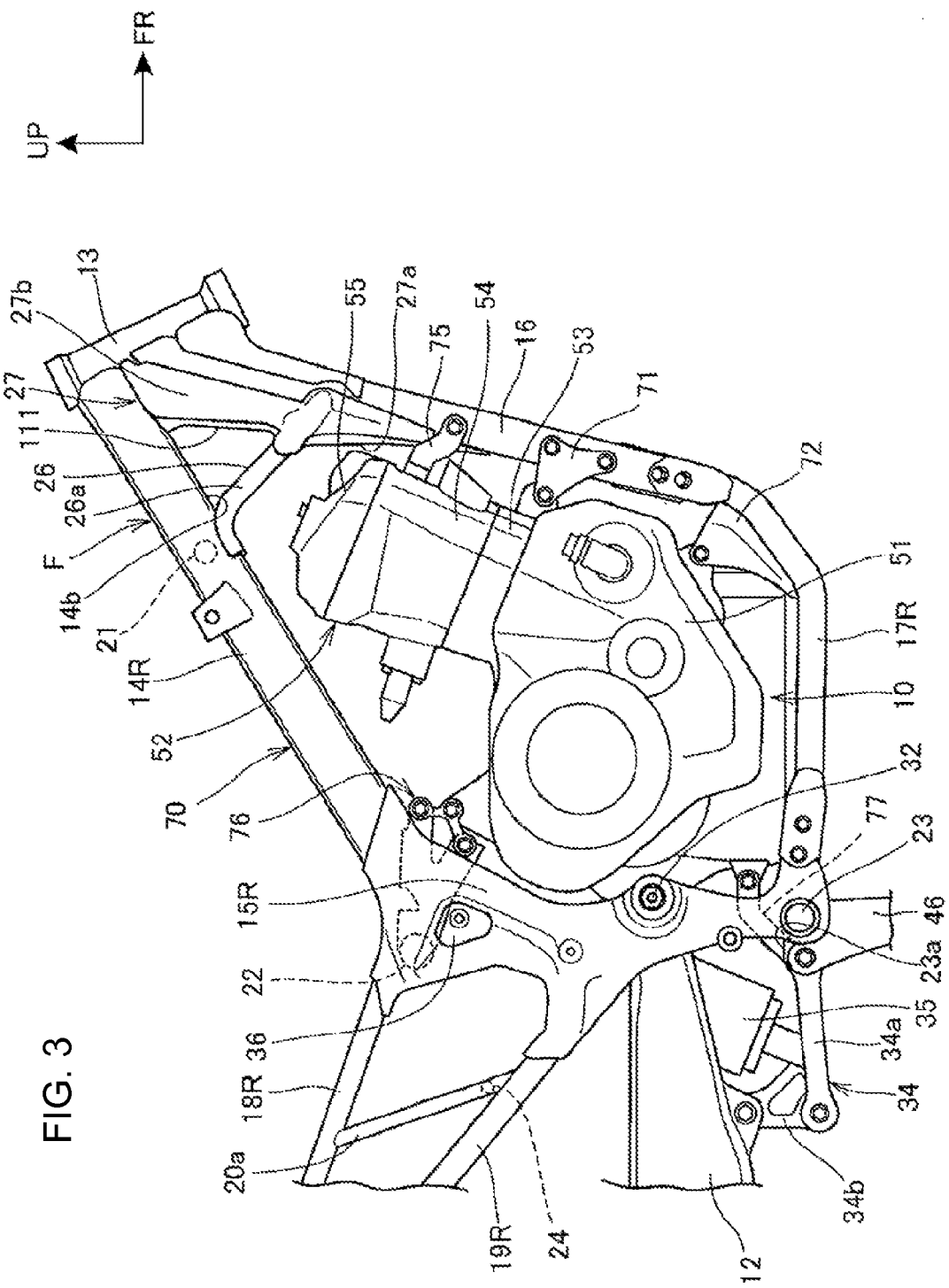
FIG. 3 is a right side elevational view of a front vehicle body portion, showing a supporting structure for an engine.

FIG. 1 is a left side elevational view of a motorcycle 1 according to an embodiment of the present invention. FIG. 2 is a left side elevational view of the motorcycle 1 with a vehicle body cover and accessories being removed. FIG. 3 is a right side elevational view of a front vehicle body portion, showing a supporting structure for an engine 10.

As shown in FIGS. 1 through 3, the motorcycle 1 is a vehicle in which the engine 10 is supported on a vehicle body frame F. A front fork 11 that supports a front wheel 2 is steerably supported on a front end of the vehicle body frame F, and a swing arm 12 that supports a rear wheel 3 is mounted on a rear portion of the vehicle body frame F. In an embodiment, the motorcycle 1 may be a saddle-type vehicle in which a seat 5 for a vehicle occupant to be seated astride thereon is mounted on an upper region of a longitudinally central portion of the vehicle body frame F.

The vehicle body frame F may include a head pipe 13 disposed on the front end thereof, a pair of left and right main frames 14L and 14R extending rearwardly and obliquely downwardly from the head pipe 13, a pair of pivot frames 15L and 15R extending downwardly from the rear ends of the main frames 14L and 14R, respectively, a down frame 16 extending rearwardly and downwardly from a lower portion of the head pipe 13, and a pair of left and right lower frames 17L and 17R branched leftwardly and rightwardly and extending rearwardly from the lower end of the down frame 16 and connected to the lower ends of the pivot frames 15L and 15R.

The vehicle body frame F may also include a pair of left and right seat frames 18L and 18R extending rearwardly and upwardly from rear regions of upper portions of the pivot frames 15L and 15R toward a rear end portion of the vehicle. A pair of left and right subframes 19L and 19R extend rearwardly and upwardly from rear regions of vertically intermediate portions of the pivot frames 15L and 15R and connect to rear portions of the seat frames 18L and 18R, and a plurality of joint frames 20a, 20b, and 20c vertically interconnecting the seat frames 18L and 18R and the subframes 19L and 19R in a truss-like configuration.

The vehicle body frame F may further include a front cross member 21 interconnecting front portions of the main frames 14L and 14R along widthwise directions of the vehicle, an upper cross member 22 interconnecting upper portions of the pivot frames 15L and 15R along the widthwise directions of the vehicle, a lower cross member 23 interconnecting the lower ends of the pivot frames 15L and 15R along the widthwise directions of the vehicle, a rear cross member 24 interconnecting the left and right joint frames 20a along the widthwise directions of the vehicle, and a rear-end cross member 25 interconnecting the rear ends of the seat frames 18L and 18R along the widthwise directions of the vehicle.

The vehicle body frame F may further include a stiffener frame 26 connected to the left and right main frames 14L and 14R and extending to a position near a rear surface of the down frame 16. Specifically, in an embodiment, the stiffener frame 26 may be a single pipe member having a pair of left and right front extensions 26a extending forwardly and downwardly from the respective main frames 14L and 14R and a transverse extension 26b (see FIG. 8) extending near the rear surface of the down frame 16 and interconnecting the front ends of the front extensions 26a along the widthwise directions of the vehicle.

The vehicle body frame F may further include a side plate-like member 27 that reinforces members around the head pipe 13.

The side plate-like member 27 has a rear plate-like portion 27a disposed in facing relation to the rear surface of the down frame 16 and a pair of left and right side plate-like portions 27b extending forwardly from the left and right side edges of the rear plate-like portion 27a and connected to a rear portion of the down frame 16. The side plate-like portions 27b have front edges connected to the head pipe 13 and the down frame 16 and upper edges connected to lower surfaces of the main frames 14L and 14R.

The side plate-like member 27 provides a box-shaped structure 113 (see FIGS. 8 and 10) having a substantially closed space therein behind an upper portion of the down frame 16. The stiffener frame 26 is disposed such that the transverse extension 26b extends through a rear portion of the box-shaped structure 113, and is connected to the down frame 16 by the side plate-like member 27.

A steering shaft (not shown) may be rotatably supported by the head pipe 13. A bottom bridge 28 and a top bridge 29 that extend along the widthwise directions of the vehicle are fixed respectively to the lower and upper ends of the steering shaft. The front fork 11 has the bottom bridge 28 and the top bridge 29, and the front wheel 2 is supported on a front wheel axle 30 mounted on the lower end of the front fork 11. The rider may steer the front wheel 2 through a handlebar 31 that is secured to the top bridge 29.

The swing arm 12 has a front end supported on a pivot shaft 32 that interconnects the left and right pivot frames 15L and 15R, and swings vertically about the pivot shaft 32. The rear wheel 3 is supported on a rear wheel axle 33 that extends through the rear end of the swing arm 12.

A link mechanism 34 that interconnects a front portion of the swing arm 12 and the lower cross member 23 is coupled to the swing arm 12. The lower end of a rear suspension 35 is coupled to the link mechanism 34.

The link mechanism 34 includes a rod member 34a extending rearwardly from the lower cross member 23 and a triangular link 34b, which is of a substantially triangular shape as viewed in a side elevation, coupled to the swing arm 12, the rear suspension 35, and the rod member 34a. The rear suspension 35 has an upper end coupled to a suspension stay 36 (see FIG. 3) extending forwardly and downwardly from the upper cross member 22.

A fuel tank 37 is disposed upwardly of the main frames 14L and 14R. The seat 5 is supported on the seat frames 18L and 18R and extends rearwardly contiguously from a rear portion of the fuel tank 37.

The vehicle body of the motorcycle 1 may be partly covered with a vehicle body cover assembly 38. The vehicle body cover assembly 38 includes a front cover covering the periphery of the head pipe 13 on its front and sides, a front screen 40 extending upwardly from the upper edge of a front surface of the front cover 39, an under cover 41 covering the lower frames 17L and 17R from below, and a rear cover 42 covering the seat frames 18L and 18R and the subframes 19L and 19R on their sides. An upper portion of the front wheel 2 is covered with a front fender 43 mounted on the front fork 11. A rear fender 44 that covers the rear wheel 3 from above is mounted on the rear end of the vehicle body frame F.

A pair of left and right steps 45 for the rider to place its feet thereon are mounted on lower portions of the pivot frames 15L and 15R. A main stand 46 is mounted on the lower cross member 23.

The engine 10 may be an in-line two-cylinder engine having a crankcase 51 that supports a crankshaft extending along the widthwise directions of the vehicle, and a cylinder assembly 52 extending upwardly from an upper surface of the crankcase 51.

The cylinder assembly 52 includes a cylinder block 53 housing pistons (not shown) therein, a cylinder head 54, and a cylinder head cover 55, which are arranged successively from the crankcase 51. The cylinder block has two cylinders juxtaposed horizontally along the widthwise directions of the vehicle. The cylinder block of the engine 10 has a cylinder axis C inclined slightly forwardly from the vertical direction. The cylinder axis C is inclined much more forwardly than the down frame 16.

The crankcase 51 houses a transmission in a rear portion thereof. The transmission has an output shaft 56 projecting outwardly to the left side from the rear portion of the crankcase 51, and a drive sprocket 57 is fixed to the shaft end of the output shaft 56. The output power of the engine 10 is transmitted to the rear wheel 3 by a drive chain 59 that is trained around the drive sprocket 57 and a driven sprocket 58 integrally provided on the rear wheel 3.

An intake device (not shown) for the engine 10 may be disposed between the engine 10 and the fuel tank 37.

Exhaust pipes 60 (only one exhaust pipe 60 is shown) are disposed on left and right portions of a front surface of the cylinder head 54. The exhaust pipes 60 extend forwardly and downwardly from respective exhaust ports defined in front surfaces of the cylinders in the cylinder head 54, are then bent to the right side, and extend rearwardly outside of a lower region of a right side portion of the engine 10. The exhaust pipes 60 have rear portions joined together into one pipe whose rear end is connected to a muffler 61 that is disposed on the right side of the rear wheel 3. The muffler 61 is inclined rearwardly and upwardly and has an exhaust opening 61a defined in the rear end thereof and positioned above an upper surface of the rear wheel 3. The muffler 61 has an upper portion supported by the right subframe 19R.

The motorcycle 1 may be designed to travel on rough terrain. Specifically, the motorcycle 1 may be highly capable of traveling on rough terrain because while the motorcycle 1 is kept in an upright state by the main stand 46, the position of a lower surface of the vehicle body (a lower surface of the link mechanism 34), with respect to a lower surface of the rear wheel 3, is higher than one-third of the vertical length of the rear wheel 3, so that the motorcycle 1 has a high minimum height from the ground. In addition, the motorcycle 1 can travel on rough terrain at high speeds because the upper end of the front screen 40 is higher than rearview mirrors 62. Moreover, since the exhaust opening 61a of the muffler 61 is in a high position, the motorcycle 1 is highly capable of traveling on wet surfaces and through puddles of water.

As shown in FIG. 3 (see also FIGS. 1 and 2), the head pipe 13, the main frames 14L and 14R, the pivot frames 15L and 15R, the down frame 16, and the lower frames 17L and 17R of the vehicle body frame F jointly make up a frame body 70 in which they are contiguously connected as viewed in side elevation.

The engine 10 is disposed in the frame body 70 and supported by a plurality of engine hangers provided on the frame body 70.

The engine hangers on the frame body 70 include front upper hangers 71 on a lower portion of the down frame 16, front lower hangers 72 on front portions of the lower frames 17L and 17R, and the pivot shaft 32 as a rear hanger on the pivot frames 15L and 15R. The front upper hangers 71 and the front lower hangers 72 are provided as a pair of left and right hangers each.

The front upper hangers 71 support a front upper portion of the crankcase 51, the front lower hangers 72 support a front lower portion of the crankcase 51, and the pivot shaft 32 supports a rear portion of the crankcase 51. The front upper hangers 71, the front lower hangers 72, and the pivot shaft 32 may be engine hangers having high rigidity, and may firmly support the engine 10, which reinforces a lower portion of the vehicle body frame F.

Engine hangers of low rigidity which are lower in rigidity than the front upper hangers 71, the front lower hangers 72, and the pivot shaft 32 that are of higher rigidity, are provided on the frame body 70. Specifically, these engine hangers include a first lower-rigidity hanger 75 disposed on a vertically intermediate portion of the down frame 16, second lower-rigidity hangers 76 on the upper cross member 22, and third lower-rigidity hangers 77 on a link rod support 23a disposed on a rear portion of the lower cross member 23. The second lower-rigidity hangers 76 and the third lower-rigidity hangers 77 may be provided as a pair of left and right hangers each. The link rod support 23a is a member to which the rod member 34a of the link mechanism 34 is coupled.

The first lower-rigidity hanger 75 includes an L-shaped bent member supporting a front portion of the cylinder assembly 52, or specifically, the cylinder head 54. The first lower-rigidity hanger 75 is fastened to the down frame 16 along the widthwise directions of the vehicle and to the cylinder head 54 along the longitudinal directions of the vehicle.

The second lower-rigidity hangers 76 include members extending forwardly and downwardly from the upper cross member 22, and are coupled to a rear upper portion of the crankcase 51. The second lower-rigidity hangers 76 are made low in rigidity by having an increased total length.

The third lower-rigidity hangers 77 include members extending forwardly and upwardly from the link rod support 23a and are coupled to a rear lower portion of the crankcase 51. The third lower-rigidity hangers 77 are made low in rigidity by having an increased total length.

As described above, as the lower portion of the vehicle body frame F is supported by the front upper hangers 71, the front lower hangers 72, and the pivot shaft 32 that are of high rigidity, the engine 10 can be firmly supported in place. Furthermore, as the first lower-rigidity hanger 75 and the second lower-rigidity hangers 76 are provided on an upper portion of the vehicle body frame F, i.e., above the front upper hangers and the pivot shaft 32, the first lower-rigidity hanger 75 and the second lower-rigidity hangers 76, together with the higher-rigidity hangers 71, 72, and 32 and the third lower-rigidity hangers 77, provide supporting rigidity with which to support the engine 10, while at the same time preventing the rigidity of the upper portion of the vehicle body frame F (mainly the main frames 14L and 14R and the down frame 16) from being excessively increased. Then, it is possible for the upper portion of the vehicle body frame F to flex and enhance the rider's feeling about the driving of the vehicle and riding comfort.

Figure 4:
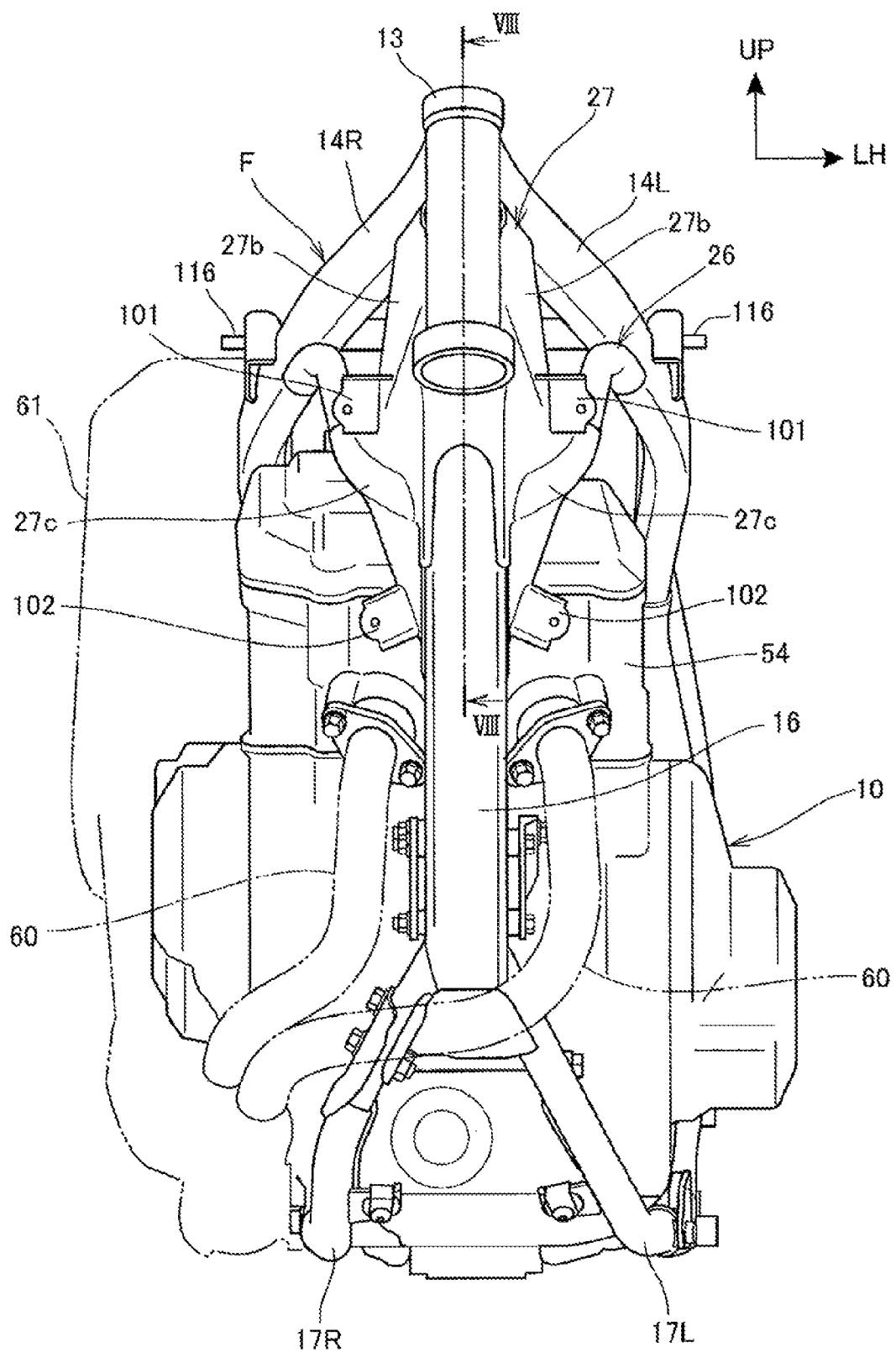
FIG. 4 is a front elevational view showing a vehicle body frame and an engine.
Figure 5:
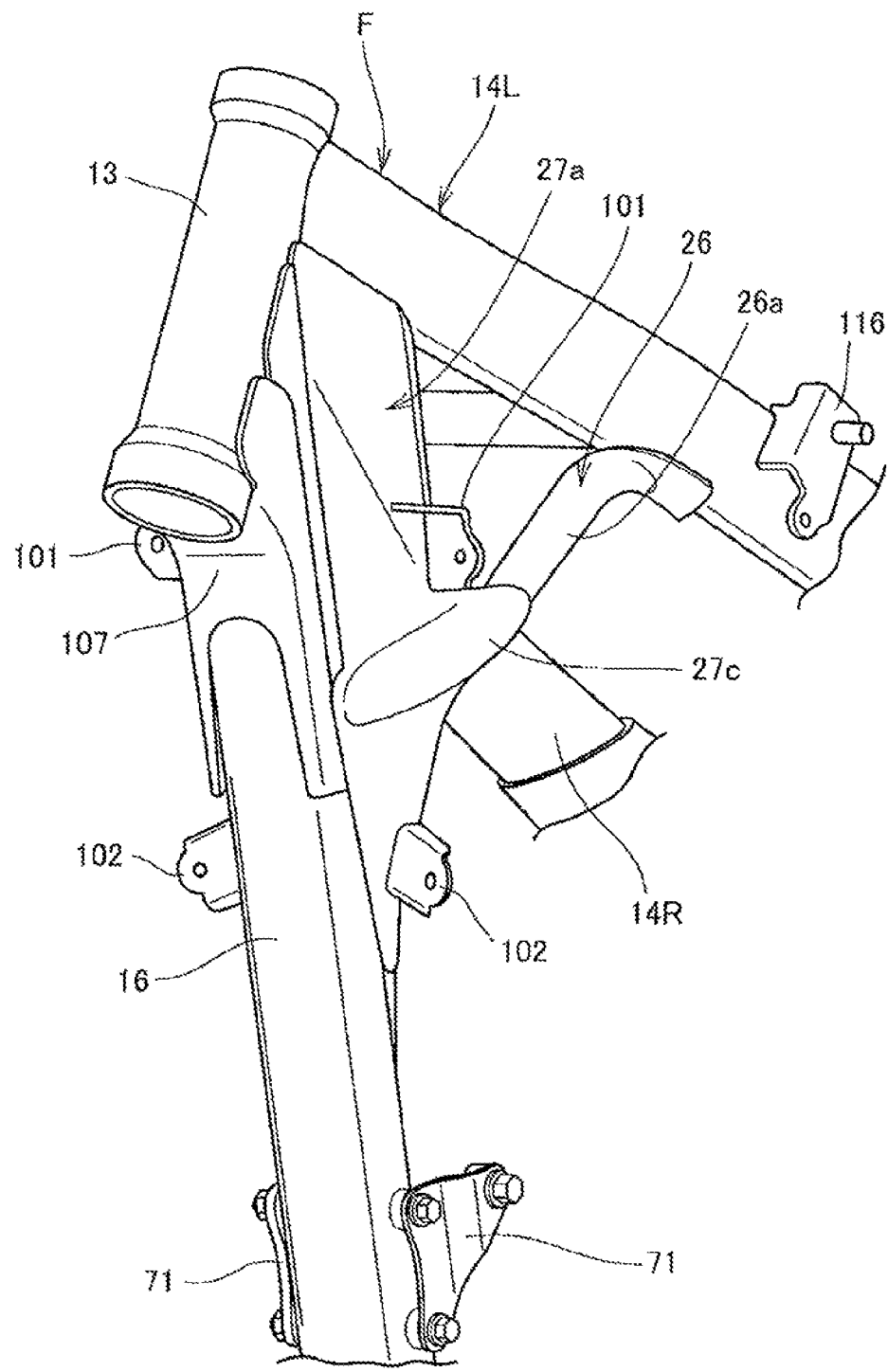
FIG. 5 is a perspective view showing a front portion of the vehicle body frame.

FIG. 4 is a front elevational view showing the vehicle body frame F and the engine 10. FIG. 5 is a perspective view showing a front portion of the vehicle body frame F.

As shown in FIG. 4, the head pipe 13, the side plate-like member 27 that is joined to the main frames 14L and 14R by welding, the down frame 16, and the stiffener frame 26 make up a front portion of the vehicle body frame F. The side plate-like member 27 has an upper end positioned at the lower ends of side surfaces of the main frames 14L and 14R and a lower end positioned forwardly of the cylinder head 54 of the engine 10. As viewed in a front elevation, the side plate-like member has its transverse width progressively greater in a downward direction from the left and right main frames 14L and 14R and progressively greater in an upward direction from its lower end forward of the cylinder head 54. The transverse width of the side plate-like member is the greatest at left and right side bulging portions 27c thereof that cover the stiffener frame 26.

A pair of left and right upper brackets 101 and a pair of left and right lower brackets 102 for supporting a radiator (not shown) are mounted on the side plate-like member 27. The upper brackets 101 project to the left and right upwardly of the stiffener frame 26 of the side plate-like member 27. The lower brackets 102 project sideways obliquely downwardly in the vicinity of the lower end of the side plate-like member 27.

As described above, the side plate-like member 27 reinforces the periphery of the head pipe 13 to make the head pipe 13 able to withstand external forces that are transmitted from the road through the front wheel 2 (see FIG. 2), and the front fork 11 (see FIG. 2) to the head pipe 13.

As shown in FIG. 5, each of the side plate-like portions 27b of the side plate-like member 27 includes the side bulging portion 27c that bulges sideways to cover a front portion of the front extension 26a of the stiffener frame 26 from outside, and the side bulging portion 27c has an edge connected to the front extension 26a by welding.

The side plate-like member 27 has a lower end positioned upwardly of the front upper hangers 71 that are attached to left and right side surfaces of the lower portion of the down frame 16.

A front reinforcing member 107 is welded to a lower portion of the head pipe 13 and an upper portion of the down frame 16. The front reinforcing member 107 is formed by bending a plate, and reinforces the junction between the head pipe 13 and the down frame 16.

Figure 6:
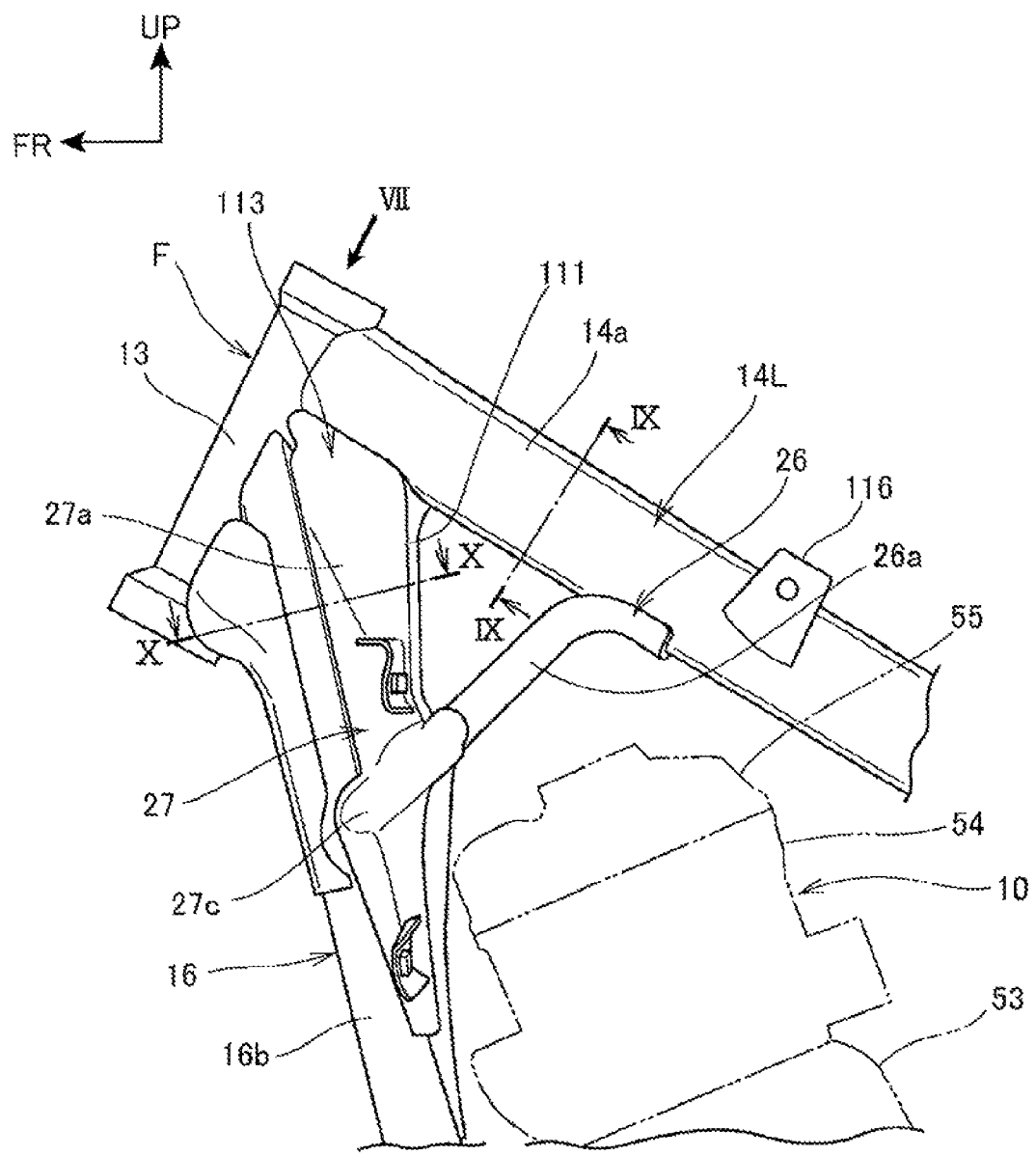
FIG. 6 is a left side elevational view showing the front portion of the vehicle body frame.

FIG. 6 is a left side elevational view showing the front portion of the vehicle body frame F.

The side plate-like member 27 has an upper edge connected to lower edges of outer side surfaces 14c of the main frames 14L and 14R (only the main frame 14L closer to the viewer is shown). The side plate-like member 27 has a front edge wherein upper portions of the side plate-like portions 27b (above the side bulging portions 27c) are connected to the head pipe 13 and rear edges of side surfaces 16b of the down frame 16. The side bulging portions 27c of the side plate-like portions 27b and lower portions of the side plate-like portions 27b (below the side bulging portions 27c) are connected to longitudinally intermediate portions of the side surfaces 16b of the down frame 16 and the rear edges of the side surfaces 16b.

The side bulging portions 27c extend along the front extensions 26a of the stiffener frame 26 which extend rearwardly and upwardly. Therefore, although the stiffener frame 26 is not actually connected to the down frame 16, the stiffener frame 26 looks as if it is extending from the side surfaces 16b of the down frame 16.

An upper plate-like member 111 is connected by welding to rear edges of the left and right side plate-like portions 27b above the side bulging portions 27c. The upper plate-like member 111 has an upper portion connected to the left and right main frames 14L and 14R by welding. Accordingly, the head pipe 13, the main frames 14L and 14R, the down frame 16, the stiffener frame 26, the side plate-like member 27, and the upper plate-like member 111 jointly make up the box-shaped structure 113. The box-shaped structure 113 will be described later with reference to FIGS. 8 and 10.

Figure 7:
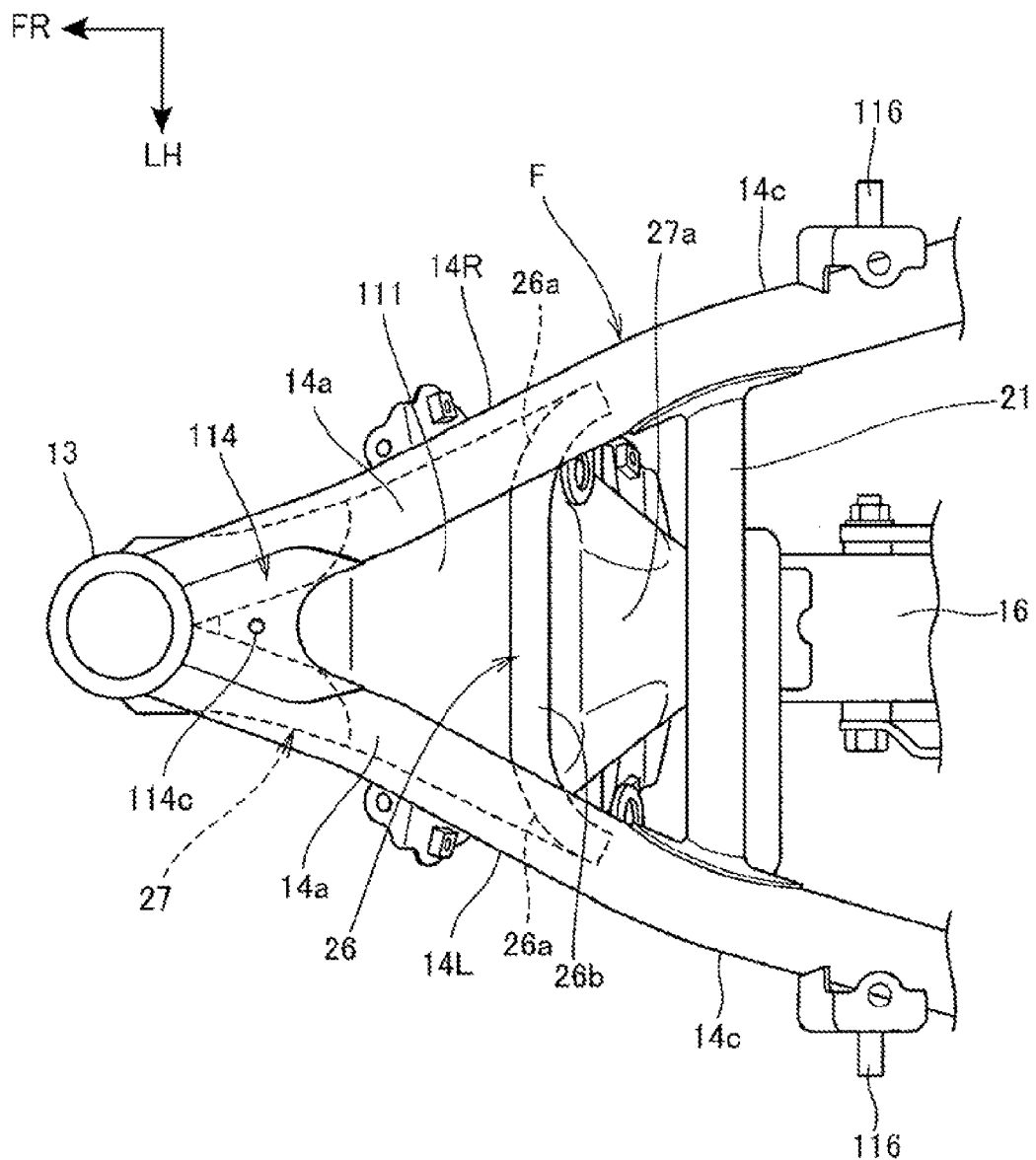
FIG. 7 is a view as viewed along the arrow VII of FIG. 6.

FIG. 7 is a view as viewed along the arrow VII of FIG. 6.

The left and right main frames 14L and 14R have front ends connected to the head pipe 13, and extend such that the distance between the left and right main frames 14L and 14R is progressively greater in a rearward direction from the head pipe 13. The left and right main frames 14L and 14R are not directly connected to each other.

In the junction where the left and right main frames 14L and 14R are connected to the head pipe 13, a plate-like upper patch 114 for reinforcing the junction between the head pipe 13 and the left and right main frames 14L and 14R is joined by welding to a rear surface of the head pipe 13 and upper surfaces 14a of the main frames 14L and 14R.

The upper plate-like member 111 has an upper portion welded to the left and right main frames 14L and 14R and a lower edge welded to an upper portion of the transverse extension 26b of the stiffener frame 26.

The rear plate-like portion 27a of the side plate-like member 27 has an upper edge welded to the transverse extension 26b of the stiffener frame 26.

The reference symbols 114c in FIG. 7 denote a bolt hole defined in the upper patch 114 for fastening a front end portion of the fuel tank 37 (see FIG. 1) with a bolt, and the reference symbol 116 denote tank supports provided on the upper surfaces 14a and the outer side surfaces 14c of the left and right main frames 14L and 14R for supporting a rear portion of the fuel tank 37.

Figure 8:
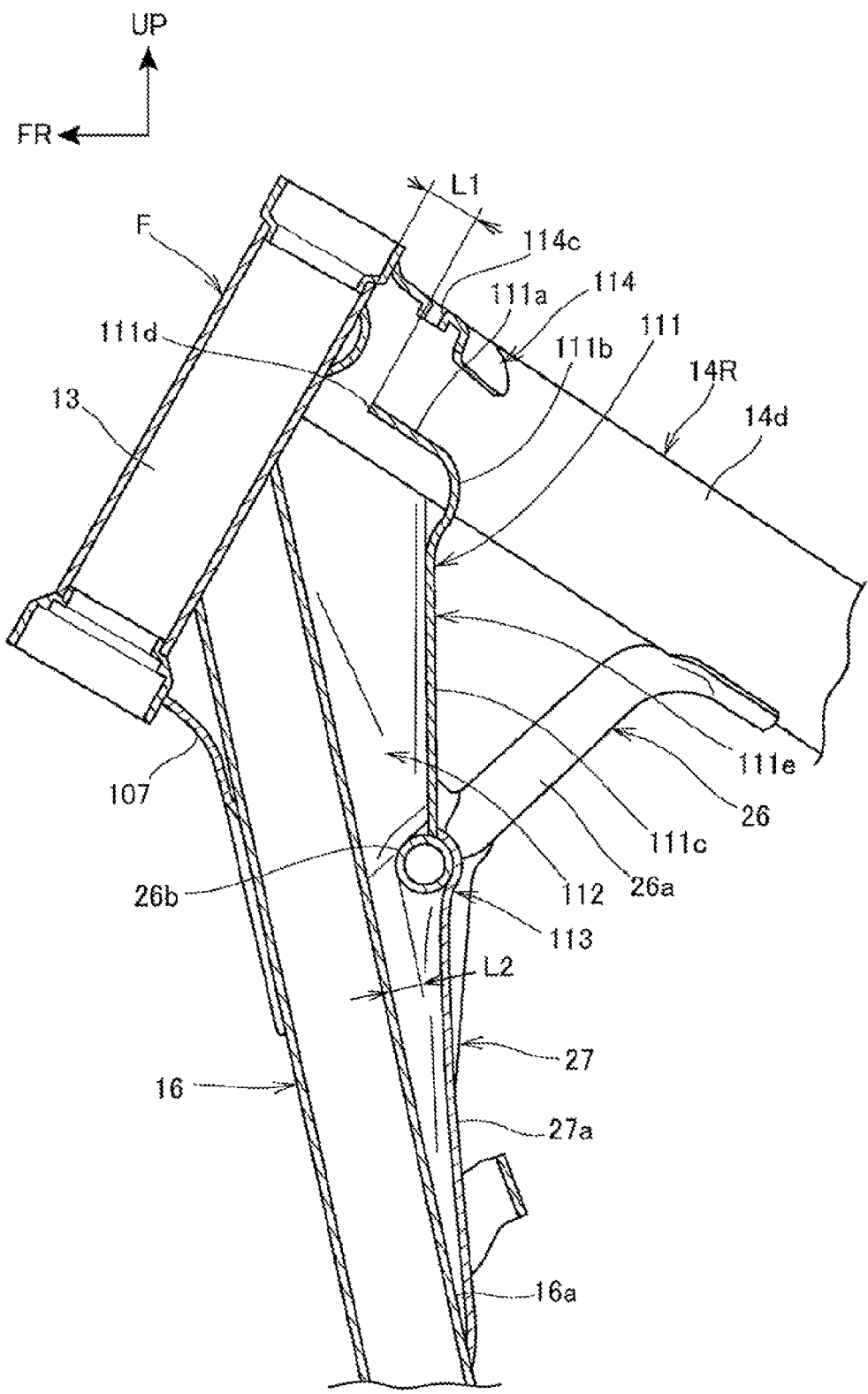
FIG. 8 is a cross-sectional view taken along line VIII-VIII of FIG. 4.

FIG. 8 is a cross-sectional view taken along line VIII-VIII of FIG. 4.

The upper plate-like member 111 extends across and is welded to the left and right main frames 14L and 14R (only the main frame 14R is shown) and the stiffener frame 26.

The upper plate-like member 111 includes an upper extension 111a, a curved portion 111b, and a lower extension 111c which are integrally formed with each other.

The upper extension 111a extends along longitudinal directions of the left and right main frames 14L and 14R, and are welded to inner side surfaces 14d of the respective left and right main frames 14L and 14R. The upper extension 111a has a front edge 111d spaced rearwardly at a distance L1 from the rear surface of the head pipe 13 (the rearmost surface of the head pipe 13 except larger-diameter portions on the upper and lower ends of the head pipe 13). Therefore, it is not necessary to weld the main frames 14L and 14R and the upper extension 111a all the way back in the space between the left and right main frames 14L and 14R. Furthermore, since the welded regions of the main frames 14L and 14R and the upper extension 111a are close to the opening between the upper plate-like member 111 and the upper patch 114, the welded regions can easily and carefully be confirmed for quality.

The curved portion 111b is curved downwardly from the rear end of the upper extension 111a so as to be convex rearwardly. The lower extension 111c extends downwardly from the lower end of the curved portion 111b and has a lower edge welded to an upper portion of the transverse extension 26b of the stiffener frame 26.

Of the curved portion 111b and the lower extension 111c, a portion which extends below the main frames 14L and 14R serves as a below-the-frame extension 111e.

The rear plate-like portion 27a of the side plate-like member 27 has an upper end portion welded to a rear portion of the transverse extension 26b of the stiffener frame 26 and a lower edge welded to the rear surface 16a of the down frame 16.

The upper plate-like member 111 and the rear plate-like portion 27a of the side plate-like member 27 are thus vertically connected to each other by the transverse extension 26b.

The transverse extension 26b of the stiffener frame 26 is spaced rearwardly a distance L2 from the rear surface 16a of the down frame 16. The down frame 16 and the stiffener frame 26 are thus connected to each other by the side plate-like member 27. Since the stiffener plate 26 is not directly connected to the down frame 16, the joined rigidity of the main frames 14L and 14R and the down frame 16 is prevented from being increased, thereby preventing the rigidity of the vehicle body frame F in the periphery of the head pipe 13 from being excessively increased.

The head pipe 13, the main frames 14L and 14R, the down frame 16, the stiffener frame 26, the side plate-like member 27, and the upper plate-like member 111 jointly make up a box-shaped structure 113 which is vertically elongate that has a substantially closed space 112 defined therein. As the box-shaped structure 113 vertically extends along the down frame 16, the rigidity of an upper portion of the down frame 16 in particular is increased.

Figure 9:
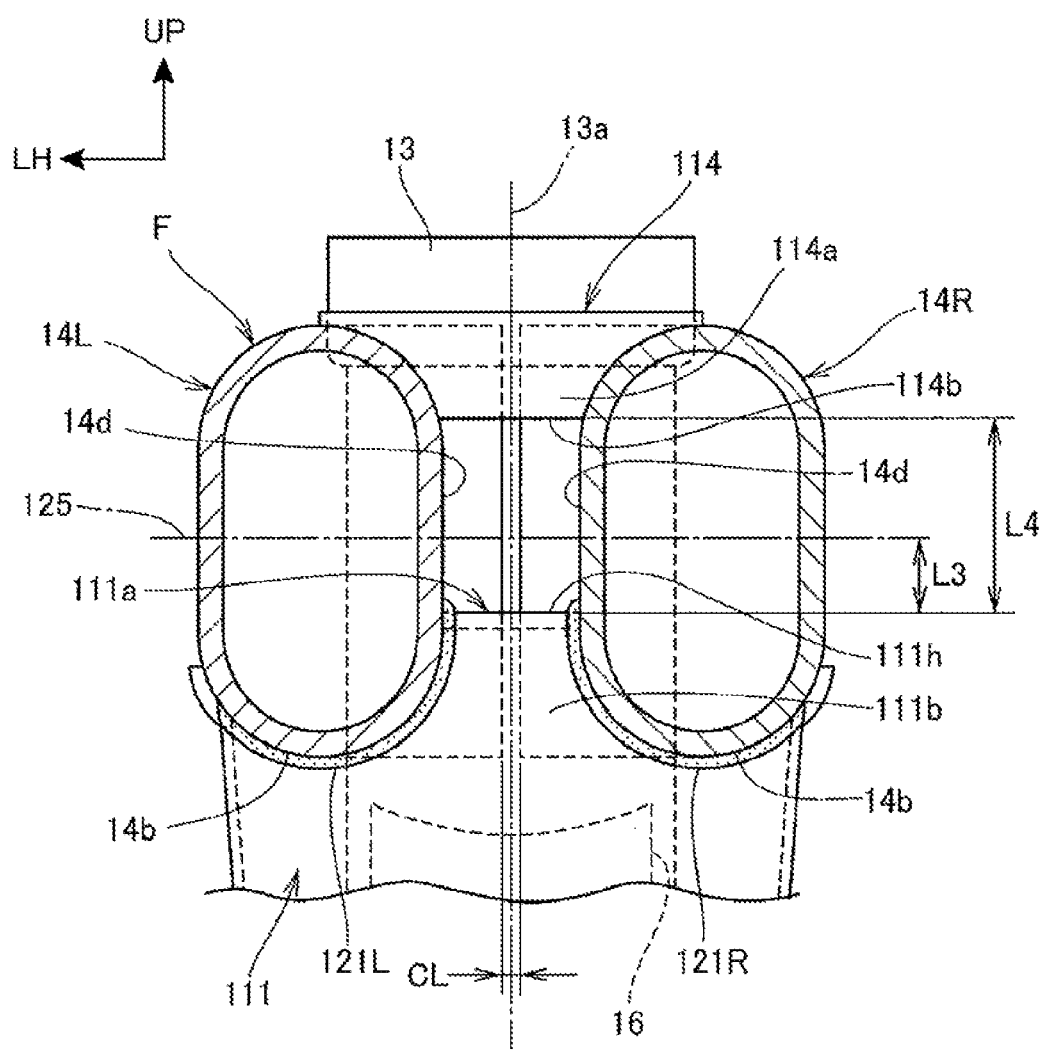
FIG. 9 is a cross-sectional view taken along line IX-IX of FIG. 6.

FIG. 9 is a cross-sectional view taken along line IX-IX of FIG. 6.

Each of the left and right main frames 14L and 14R includes a rectangular pipe having a vertically elongate rectangular cross-sectional shape and has a front end welded to the head pipe 13. A clearance CL is defined along the widthwise directions of the vehicle between the front ends of the main frames 14L and 14R connected to the head pipe 13. As the left and right main frames 14L and 14R are not connected to each other, the left and right main frames 14L and 14R and hence the front portion of the vehicle body frame F have their rigidity prevented from being excessively increased. The reference symbol 13a denote the axis of the head pipe 13.

The upper extension 111a and the curved portion 111b of the upper plate-like member 111 are welded to the inner side surfaces 14d and lower surfaces 14b of the main frames 14L and 14R. In FIG. 9, the reference symbols 121L and 121R denote welded regions (weld beads) between the inner side surfaces 14d and the lower surfaces 14b of the main frames 14L and 14R and the upper plate-like member 111.

The upper extension 111a of the upper plate-like member 111 has an upper surface 111h spaced downwardly a distance L3 from a frame center line 125 that passes through the vertical centers of the cross sections of the main frames 14L and 14R. The upper surface 111h of the upper extension 111a and a lower edge 114b of a lower extension 114a on a rear portion of the upper patch 114 are spaced a distance L4 from each other. The upper surface 111h of the upper extension 111a, the lower edge 114b of the lower extension 114a, and the inner side surfaces 14d of the respective left and right main frames 14L and 14R jointly define an opening 117 which is open rearwardly with respect to the vehicle body. The opening 117 allows the welded regions 121L and 121R and the welded regions between the head pipe 13 and the main frames 14L and 14R to be easily and carefully confirmed from between the upper extension 111a and the upper patch 114.

Figure 10:
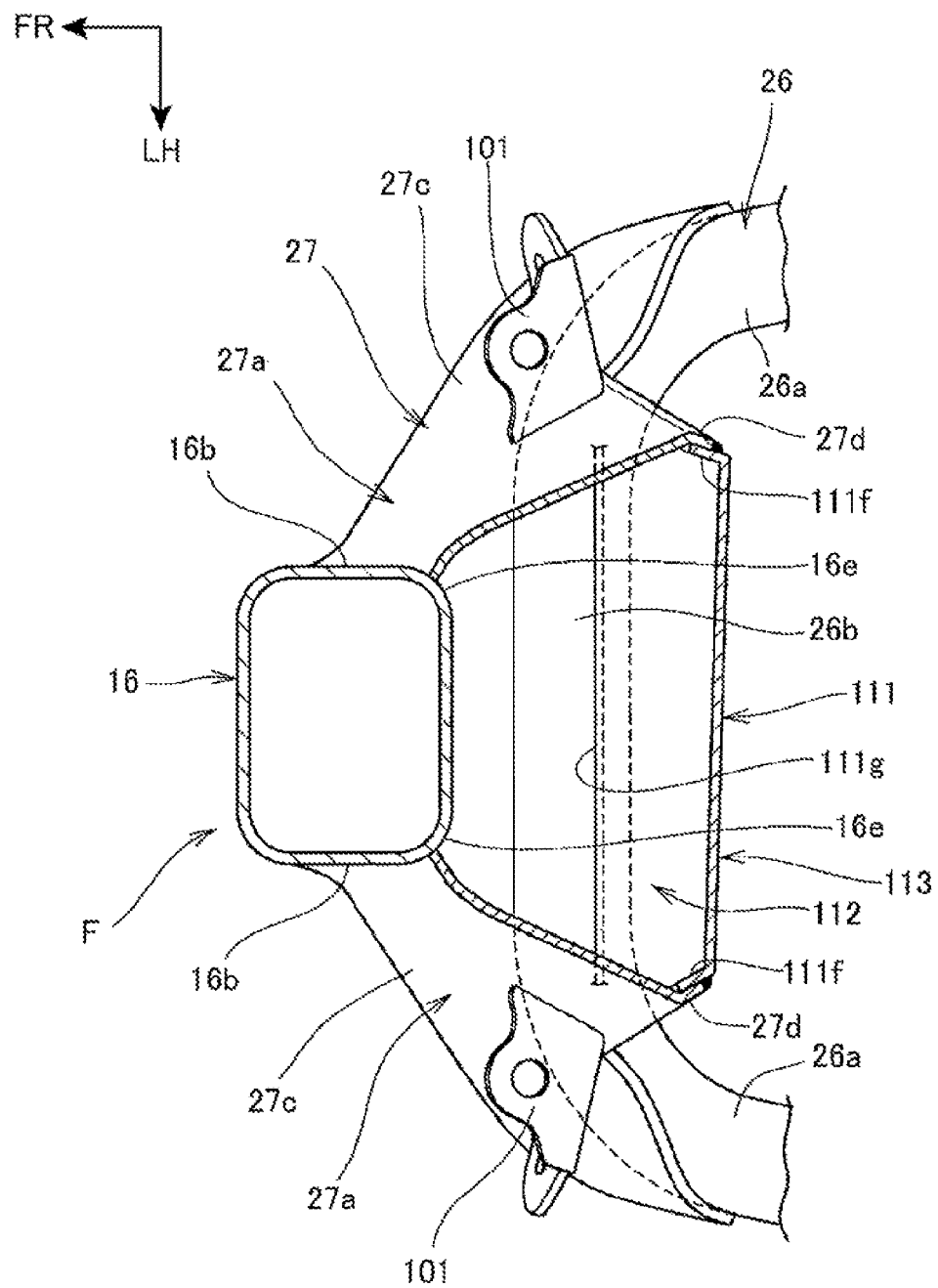
FIG. 10 is a cross-sectional view taken along line X-X of FIG. 6.

FIG. 10 is a cross-sectional view taken along line X-X of FIG. 6.

The left and right side plate-like portions 27b of the side plate-like member 27 extend rearwardly and obliquely outwardly sideways from the left and right side surfaces 16b and left and right corners 16e of the down frame 16 which includes a rectangular pipe. Left and right side edges 111f of the upper plate-like member 111 are welded to respective rear edges 27*d* of the left and right side plate-like portions 27*b*.

The rear edges 27*d* of the left and right side plate-like portions 27*b* are bent inwardly along the widthwise directions of the vehicle and obliquely rearwardly. The left and right side edges 111*f* of the upper plate-like member 111 are bent outwardly along the widthwise directions of the vehicle and obliquely forwardly. The left and right side plate-like portions 27*b* and the left and right side edges 111*f* are lap-welded.

The upper plate-like member 111 has a lower end 111*g* welded to an upper surface of the transverse extension 26*b* of the stiffener frame 26.

A rear wall 16*f* of the down frame 16, the left and right side plate-like portions 27*b* of the side plate-like member 27, the upper plate-like member 111, and the stiffener frame 26 jointly make up the box-shaped structure 113 that has a closed trapezoidal cross-sectional shape. Since the box-shaped structure 113 is of a box shape, it is lightweight and highly rigid, and hence can reinforce the upper portion of the down frame 16, etc. while preventing the vehicle from increasing its weight.

As the box-shaped structure 113 has a larger width along the widthwise directions of the vehicle than the longitudinal length thereof, it can increase the rigidity along the widthwise directions of the vehicle in particular, and enhances a reinforcing effect on the down frame 16 along widthwise directions of the vehicle, for example. Furthermore, inasmuch as the stiffener frame 26 is connected to the box-shaped structure 113, the rigidity is made higher than if only the box-shaped structure 113 is provided on the down frame 16.

The box-shaped structure 113 thus provided increases the rigidity of the periphery of the head pipe (see FIG. 6) and hence the rigidity of the front portion of the vehicle body frame F. When the vehicle travels rough terrain, it is possible to bear large external forces applied from the road through the front wheel 2 and the front fork 11 to the head pipe 13 in FIG. 2.

On the motorcycle 1 (see FIG. 1), as described above with reference to FIG. 3, the rigidity of the upper portion of the vehicle body frame F is prevented from being increased. In particular, the rigidity of the front end portions of the left and right main frames 14L and 14R and the upper portion of the down frame 16 can be increased by the box-shaped structure 113 to prevent the periphery of the head pipe 13 from being locally flexed by external forces transmitted from the road to the head pipe 13, thereby reliably transmitting external forces to the left and right main frames 14L and 14R and the down frame 16. With the external forces reliably transmitted to the left and right main frames 14L and 14R and the down frame 16, it is easy to establish a desired level of rigidity for allowing the elongate main frames 14L and 14R and the down frame 16 to flex to a necessary extent for enhancing the rider's feeling about the driving of the vehicle and also riding comfort.

As shown in FIGS. 2 and 7 through 9, in the vehicle body structure for the motorcycle 1 as the saddle-type vehicle which includes the head pipe 13, the pair of left and right main frames 14L and 14R disposed rearwardly of the head pipe 13, and the down frame 16 positioned forwardly of the engine 10 that is disposed below the main frames 14L and 14R and downwardly of the main frames 14L and 14R. The left and right main frames 14L and 14R have their front ends connected to the head pipe 13 and are disposed such that the distance between the left and right main frames 14L and 14R is progressively greater in a rearward direction. The left and right main frames 14L and 14R are connected to each other by the upper plate-like member 111, and the upper plate-like member 111 is spaced rearwardly from the head pipe 13 and has left and right ends welded respectively to the left and right main frames 14L and 14R.

According to certain embodiments, the left and right main frames 14L and 14R may be connected to each other by the upper plate-like member 111 in a region where the distance between the left and right main frames 14L and 14R is large. Working efficiency may be increased by reducing the weld length and avoiding welding operation in small regions, the joined rigidity of the main frames 14L and 14R and the head pipe 13 is rendered good, and when a plurality of upper plate-like members 111 are cut off a large plate-like stock, the yield of the plate-like members may be increased. The welded regions of the front portion of the vehicle body frame F (for example, the welded regions between the head pipe 13 and the main frames 14L and 14R and the welded regions between the main frames 14L and 14R and the upper plate-like member 111) can well be confirmed for weld quality.

Further, the upper plate-like member 111 extends along the direction in which the main frames 14L and 14R extend and is welded to the main frames 14L and 14R below the vertical center (represented by the frame center line 125 in FIG. 9) of the inner side surfaces 14*d* of the main frames 14L and 14R. The upper patch 114 disposed above the upper plate-like member 111 is welded to the rear surface of the head pipe 13 and the upper surfaces 14*a* of the left and right main frames 14L and 14R, and has its rear end disposed rearwardly of the front end of the upper plate-like member 111. Therefore, the upper patch 114 conceals the front end of the upper plate-like member 111 and the welded regions 121L and 121R between the upper plate-like member 111 and the main frames 14L and 14R, allowing the vehicle body frame F to have a good appearance. Even though the vehicle body frame F is of such a structure, the front portion of the vehicle body frame F can easily be confirmed for weld quality from between the upper plate-like member 111 and the upper patch 114.

Further, as shown in FIGS. 6, 8, and 9, each of the main frames 14L and 14R includes a tubular member having a substantially rectangular cross-sectional shape, the upper plate-like member 111 is welded to the main frames 14L and 14R in ranges from the inner surfaces 14*d* to the lower surfaces 14*b*, and the plate-like member 27 is welded to the outer side surfaces 14*c* of the main frames 14L and 14R, the down frame 16, and the below-the-frame extension 111*e* of the upper plate-like portion 111 as a lower extension extending downwardly from the main frames 14L and 14R. Consequently, the head pipe 13, the main frames 14L and 14R, the down frame 16, the upper plate-like member 111, and the side plate-like member 27 jointly define the box-like space 112 (also see FIG. 10) behind the head pipe 13. The frame rigidity in the periphery of the head pipe 13 is increased to allow the front portion of the vehicle body frame F to bear large external forces applied from the front wheel 2 (see FIG. 2) when the motorcycle 1 travels on rough terrain.

Further, as shown in FIGS. 6 and 8, the stiffener frame 26 in the form of a pipe member extends forwardly from the left and right main frames 14L and 14R and has its front end portion connected to the down frame 16 by the side plate-like member 27, and the lower end of the upper plate-like member 111 is welded to the stiffener frame 26. Therefore, the upper plate-like member 111 is reinforced by the stiffener frame 26.

It is to be noted that the stiffener frame 26 may include a single pipe member or may include two left and right split pipe members welded together at the center of the vehicle body.

Moreover, the side plate-like member 27 is welded to the side surfaces 16b of the down frame 16 and disposed so as to cover the front portion of the stiffener frame 26 from one side. Therefore, the box-like space 112 (see FIG. 10) is increased in size, and the stiffener frame 26 is supported well while withstanding large external forces from the front wheel 2 (see FIG. 2).

Further, the stiffener frame 26 includes on its front end portion the transverse extension 26b as an extension extending along the widthwise directions of the vehicle. The transverse extension 26b is spaced rearwardly from the down frame 16, and the lower end of the upper plate-like member 111 is welded to the transverse extension 26b. Since the stiffener frame 26 is not directly connected to the down frame 16, the rigidity of the vehicle body frame F in the periphery of the head pipe 13 is prevented from being excessively increased.

Moreover, as shown in FIGS. 8 and 10, the upper plate-like member 111 and the side plate-like member 27 cooperate with at least the down frame 16 in providing the box-shaped structure 113. Consequently, the upper portion of the down frame 16 is reinforced by the highly rigid box-shaped structure 113 without causing an increase in the weight, and hence the rigidity of the front portion of the vehicle body frame F is increased.

The above embodiments illustrate only certain aspects of the present invention, and may be modified and applied as desired without departing from the scope of the invention.

Certain embodiments of the present invention is not limited to the motorcycle 1, but is also applicable to saddle-type vehicles including those other than the motorcycle 1. The saddle-type vehicles refer to vehicles in general where the driver rides astride of the vehicle body, including not only motorcycles (including bicycles with a prime mover) but also three-wheeled vehicles and four-wheeled vehicles classified as ATVs (All-Terrain Vehicles).

DESCRIPTION OF REFERENCE SYMBOLS

1 Motorcycle (saddle-type vehicle)
10 Engine
13 Head pipe
14L, 14R Main frame
14a Upper surface
14b Lower surface
14c Outer side surface
14d Inner side surface
16 Down frame
26 Stiffener frame
26b Transverse extension (extension)
27 Side plate-like member
111 Upper plate-like member
111e Below-the-frame extension (lower extension)
111g Lower end
113 Box-shaped structure
114 Upper patch
F Vehicle body frame

The invention claimed is:

1. A saddle vehicle, comprising:
an engine;
a head pipe;
a pair of left and right main frames disposed rearwardly of the head pipe; and
a down frame disposed forwardly of the engine,
wherein the engine is disposed below the main frames and downwardly of the main frames,
said left and right main frames have front ends connected to the head pipe and are disposed such that a distance between the left and right main frames is progressively greater in a rearward direction,
said left and right main frames are connected to each other by an upper plate member,
said upper plate member is disposed rearwardly from said head pipe and has left and right ends welded respectively to said left and right main frames,
said upper plate member is configured to extend along a direction in which said main frames extend, and is welded to said main frames below a vertical center of inner side surfaces of said main frames, and
an upper patch disposed above said upper plate member is welded to a rear surface of said head pipe and upper surfaces of said left and right main frames, and has a rear end disposed rearwardly of a front end of said upper plate member.

2. A saddle vehicle, comprising:
an engine;
a head pipe;
a pair of left and right main frames disposed rearwardly of the head pipe; and
a down frame disposed forwardly of the engine,
wherein the engine is disposed below the main frames and downwardly of the main frames,
said left and right main frames have front ends connected to the head pipe and are disposed such that a distance between the left and right main frames is progressively greater in a rearward direction,
said left and right main frames are connected to each other by an upper plate member,
said upper plate member is disposed rearwardly from said head pipe and has left and right ends welded respectively to said left and right main frames,
each of said main frames comprises a tubular member,
said upper plate member is welded to said main frames from inner surfaces thereof to lower surfaces thereof, and
a side plate member is welded to outer side surfaces of said main frames, said down frame, and a lower extension extending downwardly from said main frames of said upper plate member.

3. The saddle vehicle according to claim 2,
wherein a stiffener frame is configured to extend forwardly from said left and right main frames, and has a front end portion connected to said down frame by said side plate member, and
a lower end of said upper plate member is welded to said stiffener frame.

4. The saddle vehicle according to claim 2,
wherein said side plate member is welded to side surfaces of said down frame and disposed so as to cover a front portion of said stiffener frame from one side.

5. The saddle vehicle according to claim 3,
wherein said stiffener frame comprises, on a front end portion thereof, an extension configured to extend along a widthwise direction of the vehicle,
said extension is disposed rearwardly from said down frame, and
the lower end of said upper plate member is connected to said extension.

6. The saddle vehicle according to claim 2, further comprising a box-shaped structure, the box-shaped structure comprising said upper plate member and said side plate member.

7. A saddle vehicle, comprising:
providing means for providing motive power to the vehicle;
steering means for steering the vehicle;
supporting means for supporting the providing means, the supporting means being disposed rearwardly of the steering means; and
second supporting means for supporting a cylinder means, the second supporting means being disposed forwardly of the providing means,
wherein the providing means is disposed below the supporting means and downwardly of the supporting means,
said supporting means have front ends connected to the steering means and are disposed such that a distance between the supporting means is progressively greater in a rearward direction,
said supporting means are connected to each other by an upper plate member,
said upper plate member is disposed rearwardly from said steering means and has left and right ends welded respectively to said supporting means,
said upper plate member is configured to extend along a direction in which said supporting means extend, and is welded to said supporting means below a vertical center of inner side surfaces of said supporting means, and
an upper patch disposed above said upper plate member is welded to a rear surface of said steering means and upper surfaces of said supporting means, and has a rear end disposed rearwardly of a front end of said upper plate member.

8. A saddle vehicle, comprising:
providing means for providing motive power to the vehicle;
steering means for steering the vehicle;
supporting means for supporting the providing means, the supporting means being disposed rearwardly of the steering means; and
second supporting means for supporting a cylinder means, the second supporting means being disposed forwardly of the providing means,
wherein the providing means is disposed below the supporting means and downwardly of the supporting means,
said supporting means have front ends connected to the steering means and are disposed such that a distance between the supporting means is progressively greater in a rearward direction,
said supporting means are connected to each other by an upper plate member,
said upper plate member is disposed rearwardly from said steering means and has left and right ends welded respectively to said supporting means,
each of said supporting means comprises a tubular member,
said upper plate member is welded to said supporting means from inner surfaces thereof to lower surfaces thereof, and
a side plate member is welded to outer side surfaces of said supporting means, said second supporting means, and a lower extension extending downwardly from said supporting means of said upper plate member.

9. The saddle vehicle according to claim 8,
wherein a stiffener frame is configured to extend forwardly from said supporting means, and has a front end portion connected to said second supporting means by said side plate member, and
a lower end of said upper plate member is welded to said stiffener frame.

10. The saddle vehicle according to claim 8,
wherein said side plate member is welded to side surfaces of said second supporting means and disposed so as to cover a front portion of said stiffener frame from one side.

11. The saddle vehicle according to claim 9,
wherein said stiffener frame comprises, on a front end portion thereof, an extension configured to extend along a widthwise direction of the vehicle,
said extension is disposed rearwardly from said second supporting means, and
the lower end of said upper plate member is connected to said extension.

12. The saddle vehicle according to claim 8, further comprising a box-shaped structure, the box-shaped structure comprising said upper plate member and said side plate member.

* * * * *